United States Patent [19]

Vighi

[11] Patent Number: 4,738,891
[45] Date of Patent: Apr. 19, 1988

[54] POLYESTER FILM LAMINATE AND CASSETTE RECORDING TAPE COMPRISED THEREOF

[75] Inventor: Cristiano A. Vighi, Sao Paulo, Brazil

[73] Assignee: Rhone-Poulenc Films, Courbevoie, France

[21] Appl. No.: 662,146

[22] Filed: Oct. 18, 1984

[30] Foreign Application Priority Data

Oct. 19, 1983 [BR] Brazil ................................. 8305832

[51] Int. Cl.$^4$ ..................... B32B 7/10; B32B 27/08; B32B 31/12; B32B 31/20
[52] U.S. Cl. ................................ 428/201; 156/176; 156/309.9; 156/322; 156/331.4; 427/365; 427/393.5; 428/204; 428/480
[58] Field of Search ............. 428/200, 201, 480, 202, 428/204; 156/176, 322, 309.9, 331.4; 427/393.5, 365

[56] References Cited

U.S. PATENT DOCUMENTS

| | | | |
|---|---|---|---|
| 3,322,605 | 5/1967 | Frech ................................. | 428/202 |
| 4,337,285 | 6/1982 | Akao et al. ..................... | 428/200 X |
| 4,387,129 | 6/1983 | Vincent ........................... | 428/200 X |
| 4,486,508 | 12/1984 | Coughlin et al. ................... | 428/480 |

Primary Examiner—Thomas J. Herbert
Attorney, Agent, or Firm—Burns, Doane, Swecker & Mathis

[57] ABSTRACT

Colored polyester film laminates, well adopted as leaders for cassette recording tapes, are facilely produced by (a) coating one face surface of a first length of polyester film with a layer of colorant and adhesive, (b) heating said coated first length of polyester film to a laminating temperature, (c) heating a second length of polyester film to essentially the same laminating temperature as that of said first length of polyester film, (d) hot calendering and coextensively laminating together said first and second lengths of polyester films to produce a polyester film laminate which comprises a colorant/adhesive interlayer, and then (e) cooling and rolling said product laminate.

10 Claims, 1 Drawing Sheet

POLYESTER FILM LAMINATE AND CASSETTE RECORDING TAPE COMPRISED THEREOF

BACKGROUND OF THE INVENTION

1. Field of the Invention

The present invention relates to the fabrication of a colored laminated film useful as a colored leader for a cassette recording tape.

2. Description of the Prior Art

Currently, one way to produce colored leaders for cassette recording tapes is by dyeing the mass of polymer during the extrusion thereof. Specifically when relatively small quantities are involved, the fabrication of colored films together with the production of normal films causes the process to become extremely complicated, because of the long periods of interruption for the cleaning of the entire line from the extruder downstream to the point where the film is rolled.

An alternative means for producing a colored polyester film would be the application of pigment on one face surface of the film, but such an operation presents the following inconveniences:

(a) if the film is colored on the inner face surface: wearing down of the pigment by friction on the lateral wheels of the cassette, with the loose particulate material so produced interfering with the recording;

(b) if the film is colored on the outer face surface: wearing down of the pigment by friction on the recording head, equally interfering with the recording. Such attrition also generates static electricity with concomitant markedly negative results vis-a-vis the quality of the recording.

SUMMARY OF THE INVENTION

Accordingly, a major object of the present invention is the provision of an improved process for the preparation of colored laminated films, which process features (i) coating a first length of polyester film with pigment and an adhesive;

(ii) heating said coated first polyester film to a laminating temperature;

(iii) heating a second length of polyester film to essentially the same temperature as that of the first polyester film;

(iv) hot calendering the polyester films together with the pigment and adhesive interposed between the two films to produce a laminate; and (v) cooling and rolling up the laminate. In a laminate made in this manner, the pigment is protected by two external polyester film layers, and it is thus impossible to wear down the pigment layer, either on the lateral wheels of the cassette, or on the recording head.

DETAILED DESCRIPTION OF THE INVENTION

More particularly according to the present invention, a colored laminated polyester film, especially adopted as a leader for cassette recording tape, is fabricated by (a) contacting and coating one face surface of a length of a first polyester film with a solution preferably containing one or more solvents, pigments and adhesives, preferably at ambient temperature;

(b) passing said coated first polyester film through a heating device, e.g., an oven, to bring it to the desired temperature;

(c) passing a length of a second polyester film through a heating device which raises the temperature of said second polyester film to that of the first polyester film;

(d) hot calendering and laminating said first and second polyester films at a temperature preferably ranging from 60° to 90° C.;

(e) cooling the resulting laminate; and (f) rolling up said laminate.

If desired more than two films can be used simultaneously or successively and, also if desired, the above operations can be repeated as many times as desired, depending upon the thickness of the starting material film and the required thickness of the colored laminate to be produced. The polyester films employed, e.g., PET films, can have equal or different thicknesses.

The adhesive used according to the invention is advantageously a known type of adhesive for polyester film, whether single-component or multi-component, e.g., the combination of polyisocyanate and a polyurethane prepolymer, preferably that marketed by Henkel under the trademarks BR660 and BR100. The pigment is similarly a known pigment for polyester film and may either be inorganic or organic, e.g., an amine pigment, especially a pigment of the type marketed by Bayer under the trademark "Ceres". The solvent, when used, is preferably ethyl acetate.

The preferred amounts for 1000 m² of film are 3–4 kg of adhesive, 6–8 g of pigment and 3–4 kg of solvent.

Preferably, at least one of the films is heated in a plurality of stages:

(i) first to a temperature of from 50° to 80° C.;

(ii) secondly to a temperature of from 70° to 100° C.; and (iii) thirdly to a higher temperature of from 70° to 100° C.

The invention envisages a polyester laminate comprising at least two outer layers of polyester film adhered together by an interlayer containing a colored pigment and adhesive.

Each film layer comprising the product laminate preferably has a thickness ranging from 10 to 20μ and the final laminate may have, for example, a total thickness on the order of 30μ.

As heretofore mentioned, the product laminate is admirably well suited for use as a leader for a cassette recording tape.

In order to further illustrate the present invention and the advantages thereof, the following specific example is given, it being understood that same is intended only as illustrative and in nowise limitative.

EXAMPLE

Figure 1:
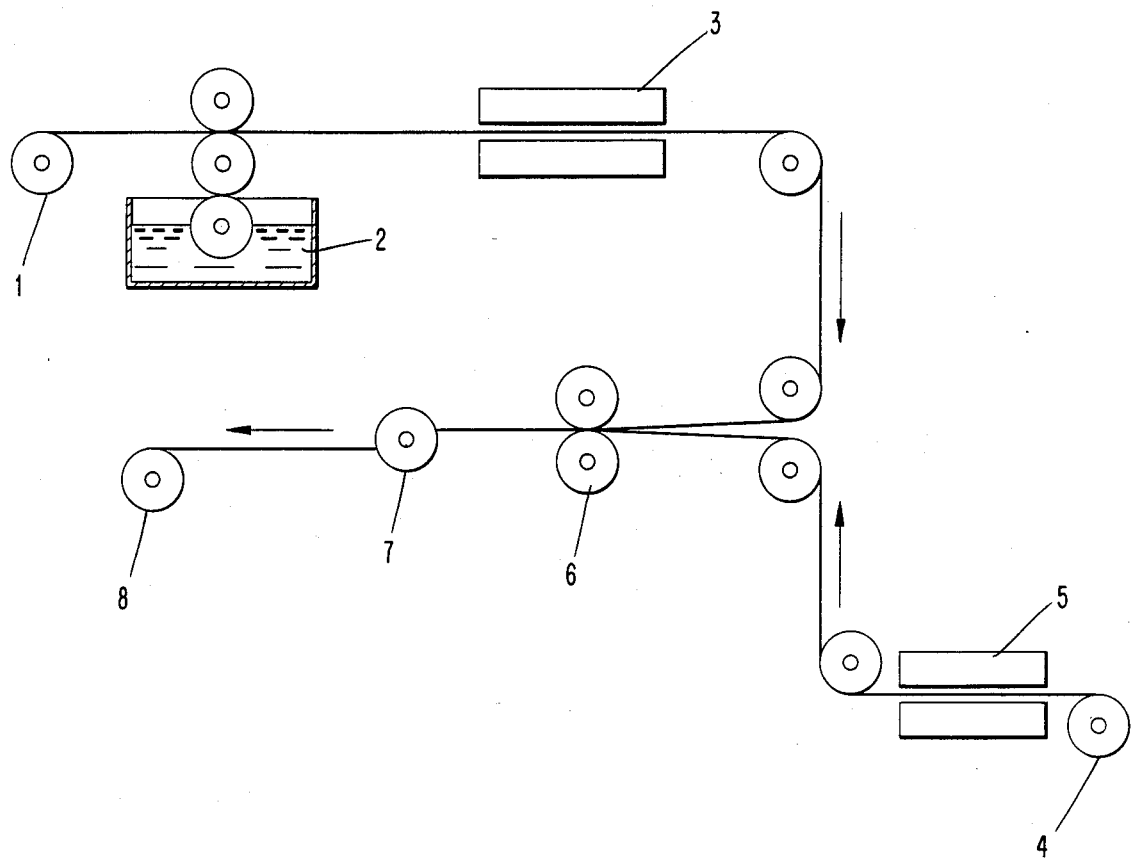
FIG. 1 is a schematic/diagrammatic representation of the process for producing a colored laminated film according to this invention.

With reference to FIG. 1 of the accompanying Figures of Drawing, a laminate film according to the invention was prepared by:

(1) unrolling from reel 1 an indefinite length of 18μ thick polyester film;

(2) coating said polyester film on one surface thereof with an ambient temperature pigmented solution, same being withdrawn from the bath 2. This solution contained the following constituent amounts, per each 1000 m² of dry film coated:
 (i) 3 kg of adhesive, "HENKEL" type BR660+BR100;
 (ii) 6 g of pigment, "BAYER" type "Ceres"; and
 (iii) 4 kg of ethyl acetate;

(3) heating the film and drying the adhesive by conveying the coated film through oven 3 comprising three temperature zones:
 (i) 1st. zone: 70° C.,
 (ii) 2nd. zone: 80° C.,
 (iii) 3rd. zone: 100° C.;

(4) simultaneously unrolling from the reel 4 an indefinite length of 12μ thick polyester film;

(5) heating said second polyester film to 100° C. in an oven 5, to bring said film to the same temperature as the film emanating from reel 1;

(6) hot calendering and consolidating the two films together at 100° C. between the calender rolls 6;

(7) cooling the laminate thus produced to 30° C. on the chill roll 7; and (8) rolling up the product laminated film on take-up reel 8.

Figure 2:
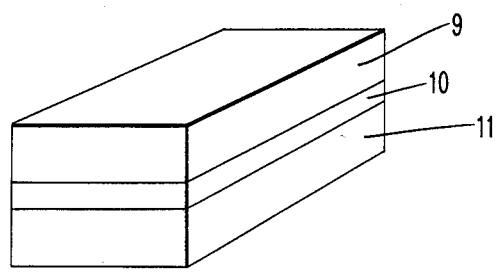
FIG. 2 is a plan view of a section of laminated film produced according to the invention.

In FIG. 2 is illustrated the final laminated product: layers 9 and 11 are the outer polyester layers. Inner layer 10 comprises the adhesive and colored pigment.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. In a cassette recording tape which includes a colored leader, the improvement which comprises, as said colored leader therefor, a colored film laminate produced by (a) coating one face surface of a first length of polyester film with a layer of colorant and adhesive, comprising a polyisocyanate and a polyurethane prepolymer, (b) heating said coated first length of polyester film to a laminating temperature, (c) heating a second length of polyester film to essentially the same laminating temperature as that of said first length of polyester film, and (d) hot calendering and coextensively laminating together said first and second lengths of polyester films to produce an outer face lamina of polyester film consolidated together by a colorant/adhesive interlayer.

2. In a process for the production of a cassette recording tape which includes a colored leader therefor, the improvement comprising, producing said colored leader by (a) coating one face surface of a first length of polyester film with a layer of colorant and adhesive, comprising a polyisocyanate and a polyurethane prepolymer, (b) heating said coated first length of polyester film to a laminating temperature, (c) heating a second length of polyester film to essentially the same laminating temperature as that of said first length of polyester film, and (d) hot calendering and coextensively laminating together said first and second lengths of polyester films to produce the colored leader for the cassette recording tape.

3. The process for producing a cassette recording tape as defined by claim 2, wherein said colorant includes a pigment.

4. The process for producing a cassette recording tape as defined by claim 2, wherein at least one of said lengths of polyester film is heated in stages, first to a temperature of from 50° to 80° C., next to a higher temperature of from 70° to 100° C., and lastly to a higher temperature of from 70° to 100° C.

5. The process for producing a cassette recording tape as defined by claim 2, wherein the leader includes at least three layers of polyester film.

6. The process for producing a cassette recording tape as defined by claim 2, wherein said coating includes a solvent.

7. The process for producing a cassette recording tape as defined by claim 6, wherein said solvent includes ethyl acetate.

8. The process for producing a cassette recording tape as defined by claim 6, wherein said coating comprises from 3 to 4 kg of adhesive, from 6 to 8 g of colorant and from 3 to 4 kg of solvent per each 1000 m² of polyester film coated.

9. The process for producing a cassette recording tape as defined by claim 2, wherein each of said lengths of polyester film has a thickness ranging from 10 to 20μ.

10. The process for producing a cassette recording tape as defined by claim 9, wherein the leader has a thickness on the order of 30μ.

* * * * *